S. GRIMSON.
GLASS DRY CLEANSER.
APPLICATION FILED MAR. 12, 1910.
997,447.
Patented July 11, 1911.
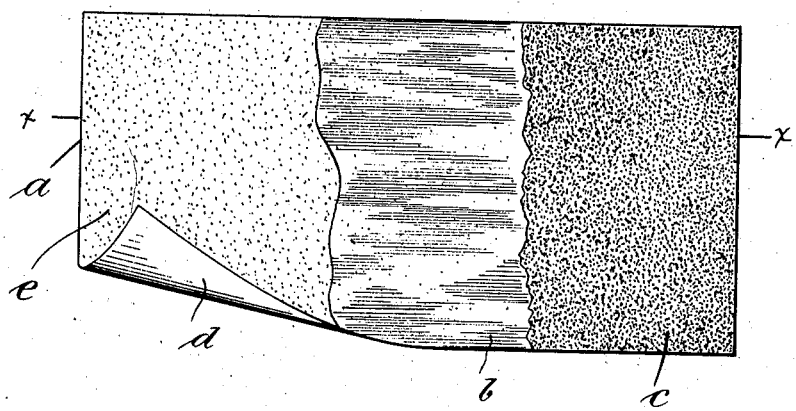
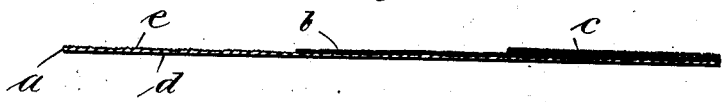
Witnesses:
Max B. A. Doring
Alice B. Pearce
Inventor
Samuel Grimson
By his Attorney Augustus T. Gurlitz

UNITED STATES PATENT OFFICE.

SAMUEL GRIMSON, OF NEW YORK, N. Y.

GLASS DRY CLEANSER.

997,447.  Specification of Letters Patent.  Patented July 11, 1911.

Application filed March 12, 1910. Serial No. 548,790.

*To all whom it may concern:*

Be it known that I, SAMUEL GRIMSON, of the borough of Manhattan, in the city, county, and State of New York, have invented a new and useful Glass Dry Cleanser; and I hereby declare that the following is a full, clear, and exact description thereof, which will enable those skilled in the art to make and use the same, reference being had to the accompanying drawing, and to the characters of reference marked thereon, which form part of this specification.

It is very desirable, for many reasons, to be able to clean glass in windows, mirrors, picture frames, show cases and similar situations without the use of water or other liquids which are liable to drop or be spattered in the operation, and I have discovered a cleanser by means of which this can readily, conveniently and rapidly be done, and all dirt, spots and other impurities removed from the surface of the glass.

In the drawing, Figure 1 is a perspective view of one form of device which may be conveniently prepared for the purpose of carrying out my invention. Fig. 2 is a longitudinal section of Fig. 1, on the line *x x*.

In this particular device, *a*, represents a sheet of paper; *d*, one side which may be calendered or be finished smooth; *e*, the other side which may be left more open or uncalendered; *b*, a thin film of vaseline, spread upon the uncalendered side of the paper, and *c*, tripoli, or other suitable powder, thereon.

In carrying out my invention I have sought to obtain a cleansing body by means of which the use of water could be avoided, and which would be free from any other objections. For this purpose a body is required which will be free from grease, oily matters, or other substances which will leave a smear, stain, or cloud upon the glass surface, and also free from any gritty or abrasive materials which will scratch or otherwise injure the glass surfaces, and one which can be conveniently applied to the surface of the glass. After many experiments I have discovered that a cleanser made by the use of vaseline and a smooth, slightly detergent powder, such as tripoli, will answer the purpose most satisfactorily. This may be used in any manner by slightly coating a suitable surface therewith, and I have found that one of the most convenient ways of using it is to spread a thin coating of vaseline evenly upon sheets of paper, then sprinkle or dust the tripoli on the same, and then cut these sheets into convenient bands or parts for application to the glass. Accordingly, by means of suitable rollers passing over the surface of the paper, a small quantity of the vaseline is spread on the paper, and then so much of the tripoli is spread or dusted on to the vaseline treated surface, as will readily adhere thereto, but not in so large a quantity as will permit the tripoli to fall from the paper in the form of dust or powder, but enough to adhere to the prepared paper, and then when a band or portion of such paper is used on the glass, the tripoli is forced into or to the paper more closely, and is retained there, together with the dirt and impurities thereby removed from the surface of the glass. In preparing this glass dry cleansing band or strip care must be taken to have the coating of vaseline spread upon the paper or other backing so thinly and evenly, and of so small a quantity, that when the covering of tripoli is applied thereon, as herein stated, the vaseline will not pass through such covering upon the glass surface, as otherwise it would itself smear or cloud the glass, it being necessary in order to produce the proper result to the best advantage that there should be sufficient vaseline to hold the tripoli powder in place, but not more than that.

For using my glass dry cleanser, any suitable body or base may be employed, by means of which it may be rubbed upon the surface of the glass, and this may also be done by rubbing the paper so prepared on the glass directly by hand.

I do not herein make claim to any mechanical device for the purpose of applying my glass dry cleanser to windows, mirrors, and other glass surfaces to be cleansed, but such subject matter is included in the scope of my original application, and a divisional application has been filed for the same, dated June 11th, 1910, Number 566,464.

I have found that any kind of thin, tough paper will produce good results when used on such a supporting device, but the best results which I have obtained have been by the use of paper having the side to be treated by the vaseline and tripoli left uncalendered, as in that condition the cleansing material adheres more satisfactorily, and the other side of the paper calendered so as to pass easily along any device adapted for applying the cleanser to windows, mirrors, etc., on which it may be desired to use the same. For this purpose I have found that sulfite paper, known commercially as Kraft paper, is very satisfactory. In applying the vaseline to the paper it is to be applied on the uncalendered side thereof, and care must be taken to apply it in such small quantities that the detergent powder will only be held to the paper thereby, and that there will not be sufficient vaseline to pass through such powder and smear the glass, etc., which is to be cleansed. The vaseline not only serves to hold the powder in place, but also seems to render the paper very pliable and satisfactory for the purpose.

This dry cleanser will be found to clean the glass quickly and thoroughly when rubbed over the same, will not scratch or mar the glass surface, or leave a smear or cloudy appearance thereon, and will leave no wet spots or splashes where it is employed, and is very convenient and durable. My experiments have shown that paper of the character mentioned, when used for the backing, gives the most satisfactory results, and while I am not certain of the reason for this, I believe it is because by such paper only a very small quantity of vaseline is absorbed, and this adheres to the paper, and is sufficient to hold the detergent powder to such backing; while if porous or woven materials are used, a considerably larger quantity of vaseline is required, some of which enters the pores and interstices in the backing, and this is forced out through the detergent powder when the band is pressed upon the glass to cleanse and polish it, and thereby the surface of the glass is smeared or clouded, and not cleansed or polished. The similar or suitable material or backing contemplated is therefore such material or backing as has the qualities of the paper mentioned, that is, such as will not take up so much vaseline as will pass through the detergent powder, and smear or cloud the glass when the band is used.

This improvement will be found of great advantage as by means of it the interior of show cases and show windows in which delicate fabrics and manufactures are displayed can readily be cleaned without endangering the same, by splashing of water, etc., and in like manner the glass of mirrors and pictures can be cleaned while in position on walls, etc., without similar danger to wall coverings, hangings, or carpets, etc.

Having thus described my invention, what I claim as new, and desire to secure by Letters Patent, is—

1. A glass dry cleanser consisting of a cleansing surface of tripoli powder, a suitable backing for such surface, in combination with a minute coating of vaseline spread on such backing, and adapted to hold such tripoli powder to such backing without passing through such powder.

2. A glass dry cleanser consisting of a cleansing surface of slightly detergent powder free from gritty particles adapted to injure glass, a suitable backing for such surface, in combination with an adhesive adapted to hold such powder to the backing without passing through the same.

SAMUEL GRIMSON.

Witnesses:
 BENJAMIN A. MORTON,
 MORTON D. GRISWOLD.